United States Patent
Lembke

(10) Patent No.: US 6,469,411 B2
(45) Date of Patent: Oct. 22, 2002

(54) COMPLIANT FOIL FLUID FILM BEARING WITH EDDY CURRENT DAMPER

(75) Inventor: Torbjörn Lembke, Länna (SE)

(73) Assignee: Magnetal AB, Uppsala (SE)

( * ) Notice: Subject to any disclaimer, the term of this patent is extended or adjusted under 35 U.S.C. 154(b) by 6 days.

(21) Appl. No.: 09/736,286

(22) Filed: Dec. 15, 2000

(65) Prior Publication Data

US 2002/0079765 A1 Jun. 27, 2002

(51) Int. Cl.⁷ .............................. H02K 7/09; F16C 32/04
(52) U.S. Cl. .......................... 310/90.5; 310/51; 310/90; 384/103
(58) Field of Search ................... 384/103, 104, 384/106; 310/90, 90.5, 51, 156.1, 154.1, 154.21

(56) References Cited

U.S. PATENT DOCUMENTS

| | | | | |
|---|---|---|---|---|
| 4,167,295 A | * | 9/1979 | Glaser | 384/105 |
| 5,231,323 A | * | 7/1993 | New | 310/90 |
| 5,427,455 A | * | 6/1995 | Bosley | 384/103 |
| 5,519,274 A | * | 5/1996 | Scharrer | 310/90.5 |
| 5,915,841 A | * | 6/1999 | Weissert | 384/104 |
| 6,118,199 A | * | 9/2000 | Lembke | 310/90.5 |
| 6,135,640 A | * | 10/2000 | Nadjafi | 384/103 |

* cited by examiner

*Primary Examiner*—Burton S. Mullins
(74) *Attorney, Agent, or Firm*—Young & Thompson

(57) ABSTRACT

The invention relates to means and methods by which a rotor is rotationally journalled relative to a stator in a magnetic field provided concentrically about a longitudinal axis, coincident with the rotor and the stator axis such that an annular gap is formed between the rotor and the stator. A flexible, sheet metal foil of non-magnetic and electrically conductive material is arranged for insertion in the annular gap in relative rotation to the rotor. The foil is shaped for generating a fluid film in cooperation with the revolving periphery of the rotor, and effective to counteract oscillating rotation of said rotor due to the formation of eddy currents that are induced in the sheet metal foil upon displacement within the magnetic field.

19 Claims, 4 Drawing Sheets

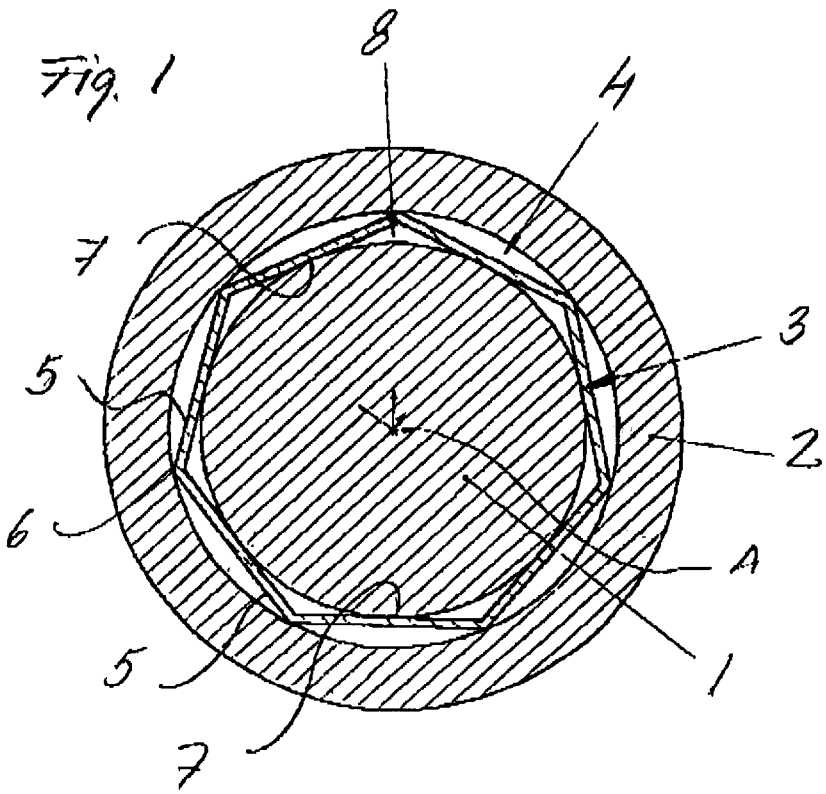
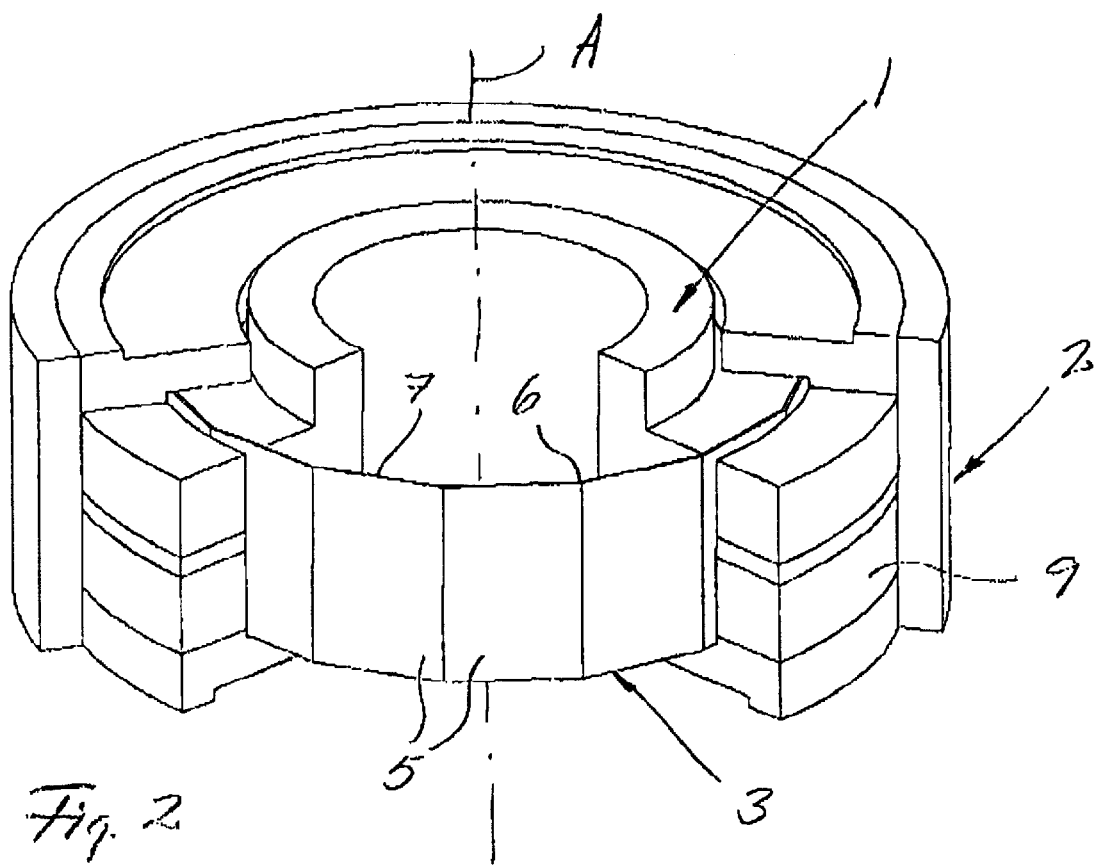

COMPLIANT FOIL FLUID FILM BEARING WITH EDDY CURRENT DAMPER

TECHNICAL FIELD OF THE INVENTION

The present invention relates to a fluid film bearing operating as an anti-vibration damper in a magnetic field that is concentrically oriented relative to a rotor and a stator in contact-free, relative rotation about a common longitudinal axis. The fluid film bearing of the invention may advantageously be integrated in electrodynamic and passive magnetic bearings in order to improve anti-vibration properties and to absorb loads, appearing as transient disturbances, in general, and to improve the start up operation of electrodynamic magnetic bearings, specifically. The present invention also relates to a method by which a rotor is rotationally journalled relative to a stator in a magnetic field, concentrically about a longitudinal axis.

TECHNICAL BACKGROUND AND PRIOR ART

In 1996, Lembke disclosed and claimed a homo-polar eddy-current magnetic bearing, a bearing structure which is commonly referred to the group of electrodynamic bearings (WO 98/32981). Magnetic bearings of this type provide advantages above other magnetic bearings in that the electrodynamic bearings are auto-stabilized without the need for external control electronics. More specifically, these bearings inherently provide a control current through their operation as a current generator. A comparatively high rotational speed is however required for producing the necessary generator effect, which reduces the operational output of said bearings. At lower speeds, some kind of additional start-up bearing has so far been required.

Typically, a safety bearing is arranged in most magnetic bearing applications to serve in a failure situation, and the safety bearing may preferably be used also as, the start-up bearing at low rotational speeds. A safety bearing commonly used in magnetic bearing applications is a conventional ball-bearing, supported on a rotor shaft of extended axial length in order to accommodate also the ball-bearing. However, rotor-dynamic problems arise in respect of the axial length of the rotor shaft.

Conventionally, a safety-bearing may be provided in the form of a ball-bearing having an inner diameter that is slightly over-sized relative to the outer diameter of the shaft, so that in normal operation, the shaft that is journalled on the bearing does not engage the inner diameter thereof. Such arrangement may give rise to several problems: in a situation where the shaft or rotor bears against the bearing surface, the rotor operation changes and its behavior may substantially increase the loads on the structure; another drawback of this construction is the building space that is required and which leads to an avoidable, additional axial length of the rotor.

The latter problem would be avoided if a safety bearing was integrated in the magnetic bearing, and thus avoiding the need for extra length of the rotor. Integration of a ball-bearing in the magnetic bearing is however not possible, when the air-gap available between the rotor and the stator merely represents some tenths of millimeters.

The operational effect of an aerodynamic bearing made from a thin, cornered sheet metal foil, known as an airfoil bearing, is disclosed in U.S. Pat. No. 5,427,455 (Bosley).

OBJECT OF INVENTION

It is an object of the present invention to provide a fluid film bearing for a rotor in contact-free rotation relative to a stator in a magnetic field, effective to counteract oscillating rotation of the rotor.

It is another object of the present invention to provide means aid methods for avoiding the drawbacks referred to above by integrating the duplex functions of a fluid film bearing and a slide bearing in a magnetic bearing assembly.

Yet another object is to provide a bearing assembly designed for improving the start up operation of electrodynamic magnetic bearings.

A further object for the present invention is to provide a fluid film bearing that is readily integrated in electrodynamic and passive magnetic bearings in order to improve anti-vibration properties and to absorb loads appearing as transient disturbances.

These and other objects are met in a fluid film bearing and a bearing assembly as defined in the appended set of claims, wherein advantageous embodiments of the invention are further specified in the subclaims thereof.

SUMMARY OF THE INVENTION

Briefly, the present invention suggests a fluid film bearing to be realized as a sheet metal foil made from a non-magnetic and electrically conductive material. The sheet metal foil is arranged to extend axially and concentrically in an annular gap that is formed between a rotor and stator in contact-free, relative rotation about a common axis. A magnetic field is concentrically oriented relative to the same axis. Should the rotor commence to oscillate such that the sheet metal foil is displaced from it's concentric orientation relative to the magnetic field, eddy currents will be induced in the foil which will then be effective to counteract the oscillating rotation of the rotor. The vibration reducing property also relies on a squeeze film effect generated by air or other fluid present that is captured between the sheet metal foil and the revolving periphery in relative rotation with the foil, thus eliminating the need for additional safety bearings which are commonly arranged in magnetic bearing assemblies.

In one implementation of the inventive fluid film bearing, the sheet metal foil is designed for providing slide-bearing action at low, rotational speeds, air-bearing action at higher rotational speeds and vibration reducing action at any rotational speed.

The invention will be further disclosed in detail below, reference being made to the accompanying schematic drawings wherein;

FIG. 1 is a sectional view showing a rotor and a stator concentrically arranged about a common longitudinal axis, a fluid film bearing of the invention being interposed in an annular gap that is formed between the rotor and the stator;

FIG. 2 is a cut open perspective view showing a bearing assembly wherein the fluid film bearing is arranged in a magnetic field that is concentrically oriented about the longitudinal axis;

DETAILED DESCRIPTION OF THE INVENTION

Figure 3:
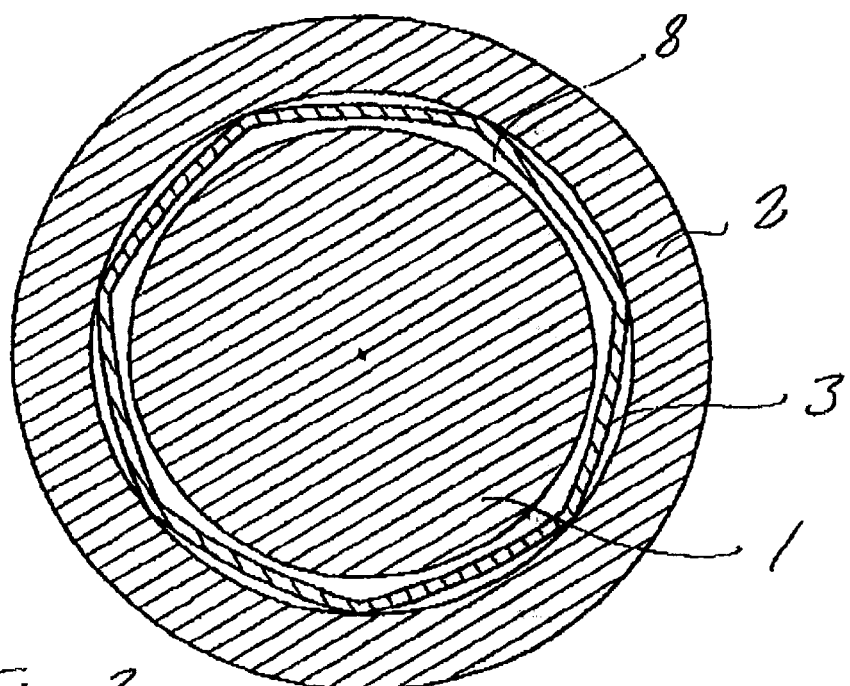
FIG. 3 is a sectional view corresponding to FIG. 1, showing the rotor in contract-free rotation relative to the stator and the fluid film bearing of the invention.

Referring to FIGS. 1–3, an inner rotor 1 is schematically shown to be journalled for contact-free, relative rotation in a stator 2. The rotor 1 and the stator 2 are concentrically arranged about a common longitudinal axis A. At least one magnet is arranged for generating a symmetric magnetic field concentrically about the longitudinal axis A (see FIG., 2). A sheet metal foil 3 made of electrically conductive and non-magnetic material is interposed in an air-gap 4, axially and concentrically extended between the rotor and the stator. The sheet metal foil 3 of FIG. 1 is of polygonal section, having planar sides 5 defined between axially running corners 6. The sides 5 extend over the air-gap 4 in axial direction. The sheet metal foil 3 is arranged in relative rotation to the rotor, and may alternatively be supported on the stator for a sliding contact with the rotor in low speed rotation mode. Optionally, the sheet metal foil may be supported on the stator in close and contact-free relation to the rotor in low speed rotational mode and in non-rotational mode, when the rotor axis coincides with the longitudinal axis A. In one aspect of the invention as will be further described below, the sheet metal foil is alternatively supported on a rotor for relative rotation about a stator.

In non-rotational mode and low speed rotational mode as illustrated in FIG. 1, an axially central portion 7 of each side may alternatively rest or slide against the outer periphery of the rotor 1, while the corners 6 engage the inner periphery of the stator 2. On each peripheral side of the contacting, central portion 7, wedge-shaped channels 8 are formed between the sheet metal foil 3 and the rotor 1, inside and near each corner of the sheet metal foil 3. When the rotor 1 rotates, air or other fluid present is forced by the rotor into the wedge-shaped contract area between the rotor and the metal foil. The fluid is thus compressed enough to urge the flexible sheet metal foil 3 radially away from the rotor periphery as illustrated in FIG. 3, by forming a fluid-film between the two elements in relative rotation at sufficient rotational speed.

Should the rotor 1 leave it's ideal axis of rotation and commence to oscillate, the rotor will urge the sheet metal foil 3 to be displaced relative to the magnetic field that is generated by one or several annular magnets 9 supported on the stator 2. Eddy currents induced in the non-magnetic, conductive sheet metal foil 3 (in accordance with Lenz' law) counteracts and reduces the oscillation, urging the sheet metal foil and the rotor towards the central axis of the bearing assembly. The field that is generated by the magnet/magnets is range-depending, an effect that enhances the vibration reducing capacity of the eddy current formation. A strongly range-depending magnetic field may be established by arranging the magnets in pairs with oppositely directed magnet fields, axially or radially, within each pair of magnets.

In the annular gap 4 between the rotor 1 and the sheet metal foil 3, a squeeze film effect is achieved in addition to the anti-vibration effect provided by the eddy current formation. The vibration reducing capacity for a given oscillation frequency and the subject fluid composition is defined by the radial width of the annular gap and the thickness of the sheet metal foil 3. The bearing assembly of the invention may operate in air, thin air below atmosphere pressure, in vacuum generating equipment, burners and combustion chambers and other gaseous and liquid fluid environments.

In order to enhance the sliding properties and reduce frictional wear and retardation until the rotor is supported by the fluid or air film, the sheet metal foil 3 may be covered on one or both sides thereof with a layer of friction reducing material, such as tin (Sn) or tin based alloy, or Teflon®, e.g.

Next, the operational characteristics of a magnetic bearing assembly where the fluid film bearing according to the invention is implemented, will be described:

As conventionally is the case in aerodynamic and hydro-dynamic bearings, a wedging effect is achieved when a medium is compressed into the wedge-shaped gap that is formed between a rotor and a stator if the rotor axis occasionally deviates from the ideal axis of rotation. Through this effect, a lift capacity is produced in the bearing. In the conventional magnetic bearing, the rotor and the stator are both circular in section and concentrically arranged. The wedging effect is thus achieved only when the rotor is displaced and non-centrally positioned relative to the stator, such that a wedge-shaped channel is formed axially between the rotor and the stator.

Conventionally, the stator is rigid and formed from a single piece of metal, e.g. a copper alloy or steel that is lined with a layer of bronze.

Figure 6:
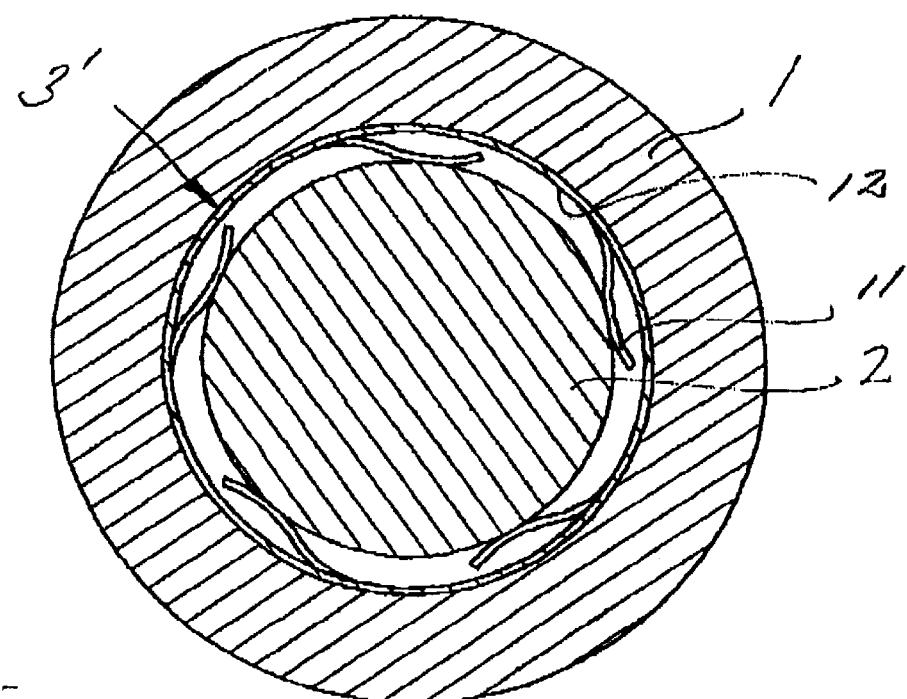
FIG. 6 is a sectional view showing the sheet metal foil of FIG. 5, integrated in an outer-rotor magnetic bearing assembly.

According to one aspect or the present invention, a sheet metal or metal foil is dimensioned in respect of it's thickness for high flexibility in a radial direction, and integrated in a magnetic bearing by being inserted concentrically in an annular gap that is formed between rotor and stator of the magnetic bearing assembly. In one embodiment, the foil is braced to the stator of the magnetic bearing arid is inherently biased to engage the periphery of the rotor/shaft in non-rotational mode and at low rotational speed (FIG. 1). A non-magnetic, electrically conductive material is chosen for the sheet metal foil, and the foil is cornered or otherwise shaped for a sliding contact with the rotor periphery at low rotational speeds. The foil is flexible enough to rise radially from contact with the revolving periphery of the rotor due to a pressure from a fluid film or air film that is generated about the revolving periphery of the rotor at higher rotational speeds. In another embodiment, the sheet metal foil is supported or braced to the inner periphery of a tube-shaped rotor in relative rotation about a stator (FIG. 6).

The foil may be angularly cornered or wave-shaped in a sectional view, in order to support the wedging operation in rotational mode. The foil may also be formed with die-cut tongues that are bent and, curved and radially protruding for biasing contact with the rotor (or optionally the stator) in non-rotational mode. In al embodiments the foil is formed with a sectional profile that is effective for generating a cushion of air due to a wedge action, that urges, the foil to rise from the surface of the rotor/stator against the biasing force in rotational mode. The foil is designed to allow a rise or lift of the foil at a comparatively low rotational speed, by being highly flexible and readily deflective in radial direction. Upon said lift of the foil, the bearing is free of contact and wear such that the rotor may be accelerated to a rotational speed whore the magnet/magnets of the bearing are effective for controlling the radial position of the rotor.

In order to further improve the start up operation of a magnetic bearing, the foil may be covered with a friction reducing material, as described above.

In contrast to the conventional air-bearing, the fluid film bearing of the present invention is however not active for absorbing only loads or forces during normal operational conditions. That is rather handled by the magnet bearing portion of the bearing assembly. The inventive fluid film bearing is thus activated only on the occasion of shocks and otherwise caused transient loads of a magnitude that is not handled by the magnet bearing. Even the start up sequence does not apply any substantial loads to the fluid film bearing, since all static loads are compensated for by magnet forces as is described in Lembke's patent, referred to above. One main function of the is subject fluid film bearing is rather to provide a vibration-reducing capacity in a magnetic bearing.

According to Weisscrt (U.S. Pat. No. 5,915,841), and Bosley as well (U.S. Pat. No. 5,427,455), a desired damping effect may be supplied to a flexible foil by insertion of an optional damping material between the foil and a stator of a bearing assembly. Suitable damping materials, however, such as rubber or viscous-elastic materials suffer from being effected by temperature and suffer also from a limited operational lifetime.

The present invention suggests a desired damping effect to be achieved by applying the foil to be supported concentrically in a magnetic field, where the field differentials are the strongest. In other words, if the foil is caused to vibrate it will sway between areas of strong magnetic force and areas of substantially less magnetic force. According to Lenz' law, electric currents will be induced in the conductive metal foil and generate an oppositely directed magnetic field and counteracting forces that will suppress and dampen the swaying motion. A major advantage of an eddy-current operated damper as compared to the application of a damping material, is that said eddy-current damper will not be impaired by high temperatures, and it will serve for practically unlimited operational lifetime.

Another advantage of the present bearing assembly is that the film of air (or other fluid present) that is produced between the sheet metal foil and the rotor in rotational mode is thin enough to provide a substantial squeeze-effect, which also adds to the vibration reducing capacity of the bearing assembly. The squeeze-effect here mentioned is well known per se. When air is used as the fluid, no lubrication is needed as is the case in conventional, oil-operated squeeze film dampers.

Figure 4:
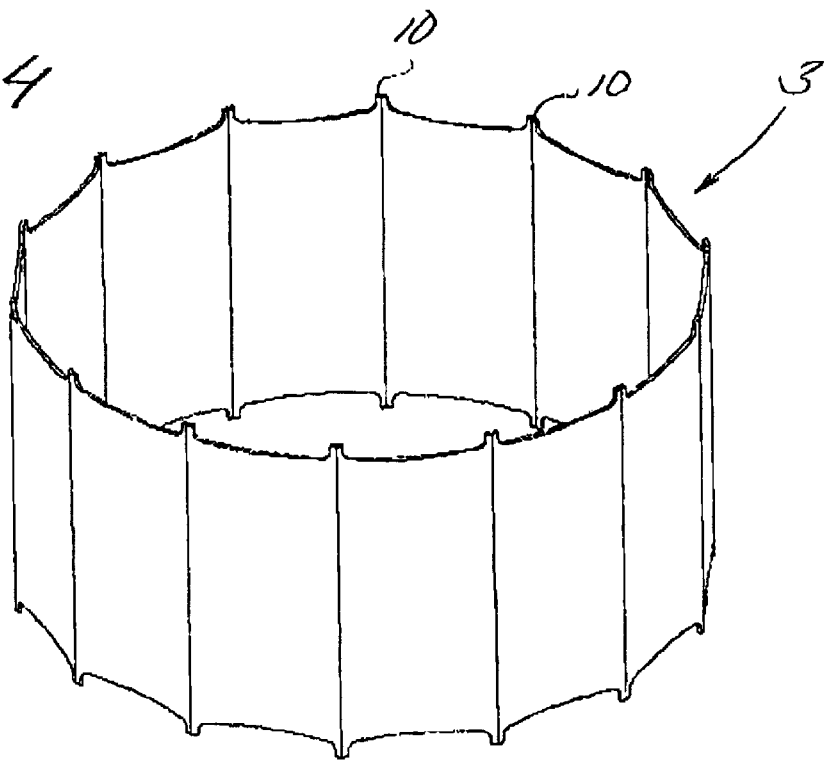
FIG. 4 is a perspective view showing an example of a sheet metal foil for integration in a magnetic bearing.
Figure 5:
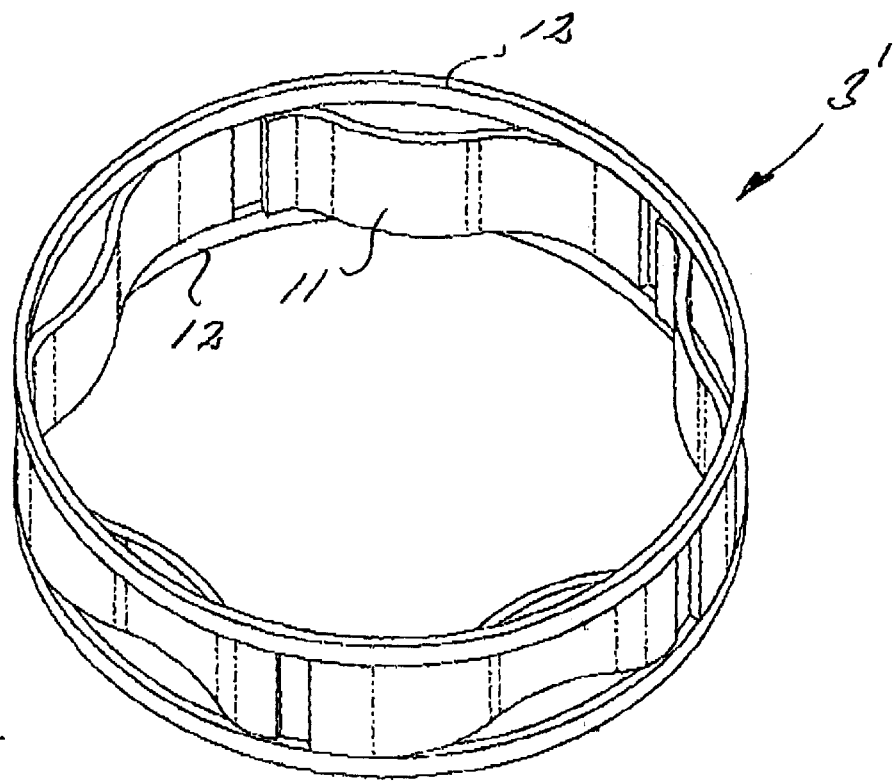
FIG. 5 is a perspective view showing another embodiment of the sheet metal foil.

The inventive bearing may be formed with projections 10 for mounting, see FIG. 4. Alternatively, the bearing surfaces of the sheet metal foil 3' are die-cut and curved to file shape of tongues 11 as in FIG. 5, and ring-shaped end rims 12 of the sheet metal foil may be attached or braced to the magnet bearing by heat-shrinking. Both methods may also be used in combination, and are shown here merely as nonlimiting examples of the attachment of a fluid film bearing according to the invention.

The present invention is also well suited for application in a magnetic bearing having a tube-shaped rotor that rotates concentrically about a non-rotating stator. Similar structures are used in motor technology, and are often referred to as outer-rotor machines.

The sheet metal foil may advantageously be applied in an outer-rotor machine, see FIG. 6: a sheet metal foil 3' as previously disclosed is supported on the inner periphery of a rotor 1 in order to rotate with the rotor. In rotational mode, the sheet metal is exposed to centrifugal loads that urges the bearing surfaces of the tongues 11 away from the stator 2. At sufficient rotational speed, the sheet metal foil lifts from the stator periphery and friction losses are reduced to a negligible level. This way the bearing assembly is provided an inherent, structurally plain centrifugal coupling.

A fluid film bearing that is formed with a centrifugal coupling as disclosed above may also be applied in vacuum pumps. In low rotational speed, the air that is always present is sufficient for providing a film of air or other fluid between the bearing surfaces. At higher rotational speeds the fluid is pressed away. At such speeds, however, the bearing surfaces are separated and there is no risk of mechanical load or wear on the bearing surfaces. Thus, the bearing assembly of the invention may also operate in processes that starts in vacuum or sub-pressure, such as gyros and flywheels. The sheet metal foil is effective only in the start up sequence, operating as slide bearing and relying on the gas molecules that are always present.

Figure 7:
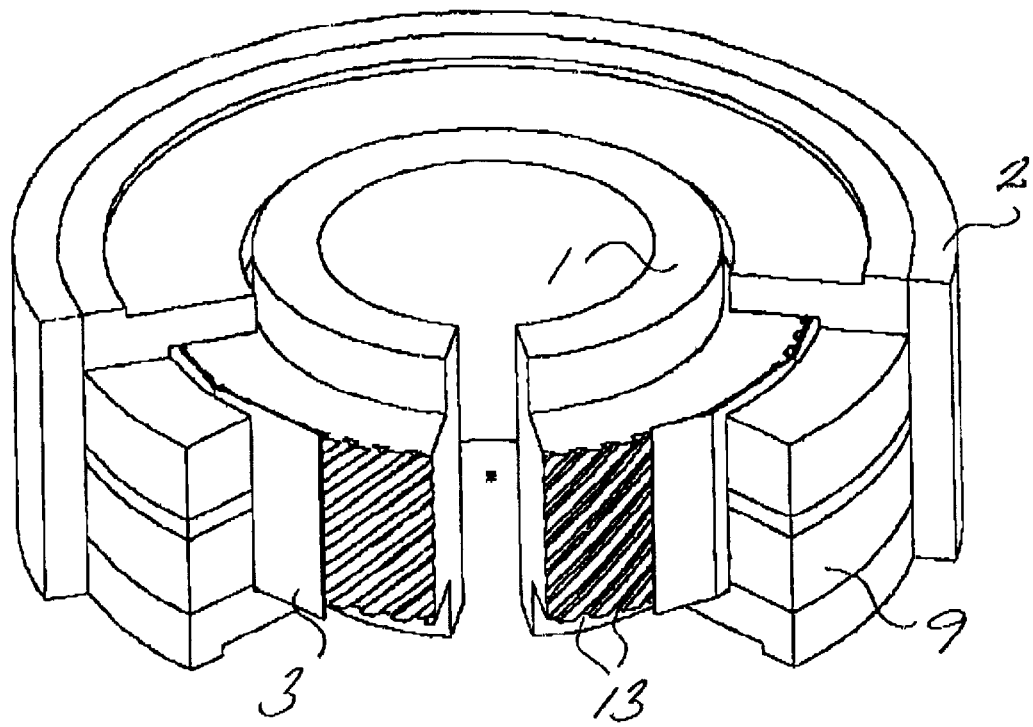
FIG. 7 is a cut open perspective view illustrating the invention implemented in a pump.

The capacity of the fluid film bearing may be enhanced by forming the rotor 1 with helical, shallow grooves 13 as illustrated in FIG. 7. The grooves 13 may be formed by etching, machining, moulding or other suitable process. The rotor 1 will then operate as an air pump (cfr. the teachings by Holweck).

Figure 8:
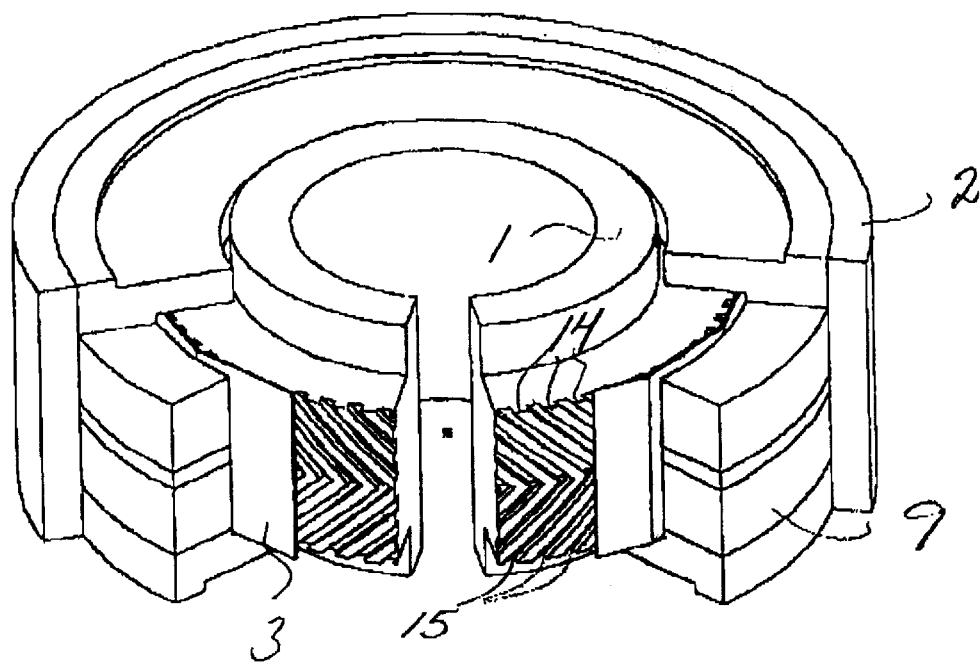
FIG. 8 is a cut open perspective view illustrating yet another implementation of the invention.

If the rotor is formed with a pattern of oppositely directed, helical grooves 14, 15 that meet in a longitudinal center of the revolving surface of the rotor 1 as illustrated in FIG. 8, a center of pressure is established at the central area. This effect may be used in all embodiments to increase the pressure of air, e.g., between the rotor and the sheet metal foil. Naturally, the helical grooves may optionally be formed on the stator in an outer-rotor implementation. In an application where the rotor is used as a pump, the principle discussed above may be used in order to achieve a journal effect and a pump action in combination.

Integrating an airfoil bearing or fluid film bearing in a magnetic bearing as suggested, provides the advantage of a compact design and avoids the need for additional safety bearings. The slide bearing action provided by the flexible foil at low speeds improves the start-up operation of the magnetic bearing, and by choosing a non-magnetic and electrically conductive material for the foil, the fluid film bearing is auto-stabilized in the rotationally symmetric magnetic field that is established by the bearing magnets.

What is claimed is:

1. A fluid film bearing, comprising a sheet metal foil arranged to be interposed and to extend axially and concentrically in an annular gap that is formed between a rotor and a stator in contact-free relative rotation concentrically about a common longitudinal axis, wherein said sheet metal foil is made from a non-magnetic and electrically conductive, flexible material, and at least one magnet arranged for generating a magnetic field concentric about said longitudinal axis, the sheet metal foil supported in the magnetic field and effective to counteract oscillating rotation of said rotor when eddy currents are induced in the sheet metal foil.

2. The fluid film bearing of claim 1, wherein the sheet metal foil is integrated in the annular gap between the rotor and the stator in contact-free relative rotation in a magnetic bearing.

3. The fluid film bearing of claim 1, wherein the sheet metal foil is integrated in the annular gap between the rotor and the stator in contact-free relative rotation in an electrodynamic magnetic bearing.

4. A magnetic bearing assembly, comprising a rotor rotationally journalled relative to a stator about a common longitudinal axis, at least one magnet supported for generating a magnetic field concentric about said longitudinal axis, the rotor and stator concentrically arranged with an annular gap therebetween, wherein a sheet metal foil of non-magnetic and electrically conductive material is interposed in the annular gap to extend axially and concentrically between the rotor and the stator; and said sheet metal foil is shaped with a sectional profile for generating a fluid film in relative rotation to the revolving periphery of one of the rotor and the stator, respectively.

5. The magnetic bearing assembly of claim 4, wherein the rotor is a shaft journalled for rotation in the stator, and the sheet metal foil is supported on the stator.

6. The magnetic bearing assembly of claim 4, wherein the rotor is a tube-shaped shaft journalled for rotation about the stator, and the sheet metal foil is supported on the rotor.

7. The magnetic bearing assembly of claim 4, wherein the fluid is gaseous.

8. The magnetic bearing assembly of claim 7, wherein the fluid is air.

9. The magnetic bearing assembly of claim 4, wherein the fluid is a liquid.

10. The magnetic bearing assembly of claim 4, wherein the sectional profile of the sheet metal foil is polygonal.

11. The magnetic bearing assembly of claim 4, wherein the sectional profile of the sheet metal foil is wave-shaped.

12. The magnetic bearing assembly of claim 4, wherein the sectional profile of the sheet metal foil comprises die-cut tongues that are curved to protrude radially towards the revolving periphery of one of the rotor and the stator, respectively, in relative rotation to the sheet metal foil.

13. The magnetic bearing assembly of claim 12, wherein the tongs are axially defined between end-rings by which the tongues are interconnected, said end-rings attaching the sheet metal foil to the rotor or the stator, respectively.

14. A magnetic assembly, comprising a rotor rotationally journalled relative to a stator about a common longitudinal axis, at least one magnet supported for generating a magnetic field concentric about said longitudinal axis, the rotor and stator concentrically arranged with an annular gap therebetween:

a sheet metal foil of non-magnetic and electrically conducive material interposed in the annular gap to extend axially and concentrically between the rotor and the stator;

said sheet metal foil shaped with a sectional profile for generating a fluid film in relative rotation to the revolving periphery of one of the rotor and the stator respectively;

wherein the sheet metal foil is radially biased to exert a sliding bearing contact with the periphery of the rotor or the stator in relative rotation to the sheet metal foil at low rotational speed, and the sheet metal foil has a flexibility to adjust to the yielding pressure from a fluid film that is generated by the revolving periphery of said rotor or said stator at higher relative rotational speeds.

15. A magnetic bearing assembly, comprising a rotor rotationally journalled relative to a stator about a common longitudinal axis, at least one magnet supported for generating a magenetic field concentric about said longitudinal axis, the rotor and stator concentrically arranged with an annular gap therebetween:

a sheet metal foil of non-magnetic and electrically conductive material interposed in the annular gap to extend axially and concentrically between the rotor and the stator;

said sheet metal foil shaped with a sectional profile for generating a fluid film in relative rotation to the revolving periphery of one of the rotor and the stator, respectively;

wherein the revolving periphery in relative rotation to the sheet metal foil is formed with helical grooves for providing the fluid film an axial component of direction.

16. The magnetic bearing assembly of claim 15, wherein the revolving periphery in relative rotation to the sheet metal foil is formed with oppositely directed, helical grooves that meet in an axial center of said periphery, providing a center of pressure acting on the sheet metal foil.

17. A method by which a rotor is rotationally journalled relative to a stator about a common longitudinal axis, at least one magnet supported for generating a magnetic field concentric about said longitudinal axis, the rotor and stator concentrically arranged with an annular gap therebetween, the method comprising the steps of:

providing a flexible, sheet metal foil of non-magnetic and electrically conductive material;

shaping the foil for insertion in the annular gap, and arranging the sheet metal foil to extend axially and concentrically in relative rotation to one of said rotor and said stator, respectively, such that a fluid film is generated between the sheet metal foil and the revolving periphery of the rotor or the stator in rotational mode.

18. The method of claim 17, wherein the sheet metal foil is shaped for insertion in the annular gap under biasing, sliding contacts in relative rotation with one of the rotor and the stator in low rotational speed, and dimensioned to yield radially from a pressure exerted by a fluid film that is generated by the revolving outer periphery of one of the rotor and the stator, respectively, at higher relative rotational speeds.

19. The method of claim 18, wherein the sheet metal foil is coated with a friction reducing material on the contact side.

* * * * *